(12) United States Patent
Stanesic et al.

(10) Patent No.: US 6,244,802 B1
(45) Date of Patent: Jun. 12, 2001

(54) CARGO HOLD SYSTEM FOR MOTOR VEHICLES

(75) Inventors: J. Matthew Stanesic, West Chester; Raymond O. Sherman, Fairfield, both of OH (US)

(73) Assignee: Nifty Products, Inc., Hamilton, OH (US)

( * ) Notice: Subject to any disclaimer, the term of this patent is extended or adjusted under 35 U.S.C. 154(b) by 0 days.

(21) Appl. No.: 09/574,020

(22) Filed: May 19, 2000

(51) Int. Cl.[7] ........................................................ B60P 7/08
(52) U.S. Cl. .............................. 410/94; 410/122; 410/155
(58) Field of Search .................................. 410/90, 91, 94, 410/95, 121, 155; 296/24.1, 39.1, 39.2; 224/42.33, 403; 248/351, 357

(56) References Cited

U.S. PATENT DOCUMENTS

| | | | |
|---|---|---|---|
| Re. 33,200 | * 4/1990 | Reynolds et al. | 296/39.1 |
| 4,027,892 | * 6/1977 | Parks | 410/3 |
| 4,512,503 | 4/1985 | Gioso. | |
| 4,718,584 | 1/1988 | Scheeny. | |
| 4,838,745 | * 6/1989 | Haydock | 410/121 |
| 4,842,460 | 6/1989 | Schlesch | 410/121 |
| 4,884,733 | 12/1989 | Geeves. | |
| 4,941,784 | * 7/1990 | Flament | 410/121 |
| 5,031,769 | 7/1991 | Shea et al.. | |
| 5,161,700 | 11/1992 | Stannis et al.. | |
| 5,167,433 | * 12/1992 | Ryan | 296/24.1 |
| 5,205,602 | * 4/1993 | Hoase et al. | 410/78 X |
| 5,392,972 | 2/1995 | Caruso et al.. | |
| 5,518,170 | 5/1996 | Rasmussen. | |
| 5,549,428 | * 8/1996 | Yeatts | 410/94 |
| 5,605,108 | * 2/1997 | Weasley | 296/39.1 X |
| 5,655,863 | * 8/1997 | Mundt | 410/94 |
| 5,662,305 | 9/1997 | Shimamura et al.. | |
| 5,819,996 | 10/1998 | Koons, Jr.. | |
| 5,865,580 | * 2/1999 | Lawrence | 410/118 |
| 6,012,885 | * 1/2000 | Taylor et al. | 410/94 |
| 6,109,847 | * 8/2000 | Patel et al. | 410/129 |

* cited by examiner

Primary Examiner—Stephen T. Gordon
(74) Attorney, Agent, or Firm—Charles R. Wilson

(57) ABSTRACT

A cargo hold system is for use in motor vehicles. The system comprises a molded floor mat configured to fit in a defined area of the vehicle, e.g. a back cargo area. The molded floor mat is made from a carpet which has looped fibers extending from its surface. The system also includes at least one rigid retention member having at least two linear legs connected at substantially right angles. The retention member further has an upstanding vertical wall and a substantially flat bottom wall. The bottom wall has adhered to it hook-type fasteners. In use, the hook-type fasteners on the rigid retention member interact with the looped fibers of the molded floor mat to create a rearrangeable system to hold in place a variety of different shaped and sized articles.

23 Claims, 6 Drawing Sheets

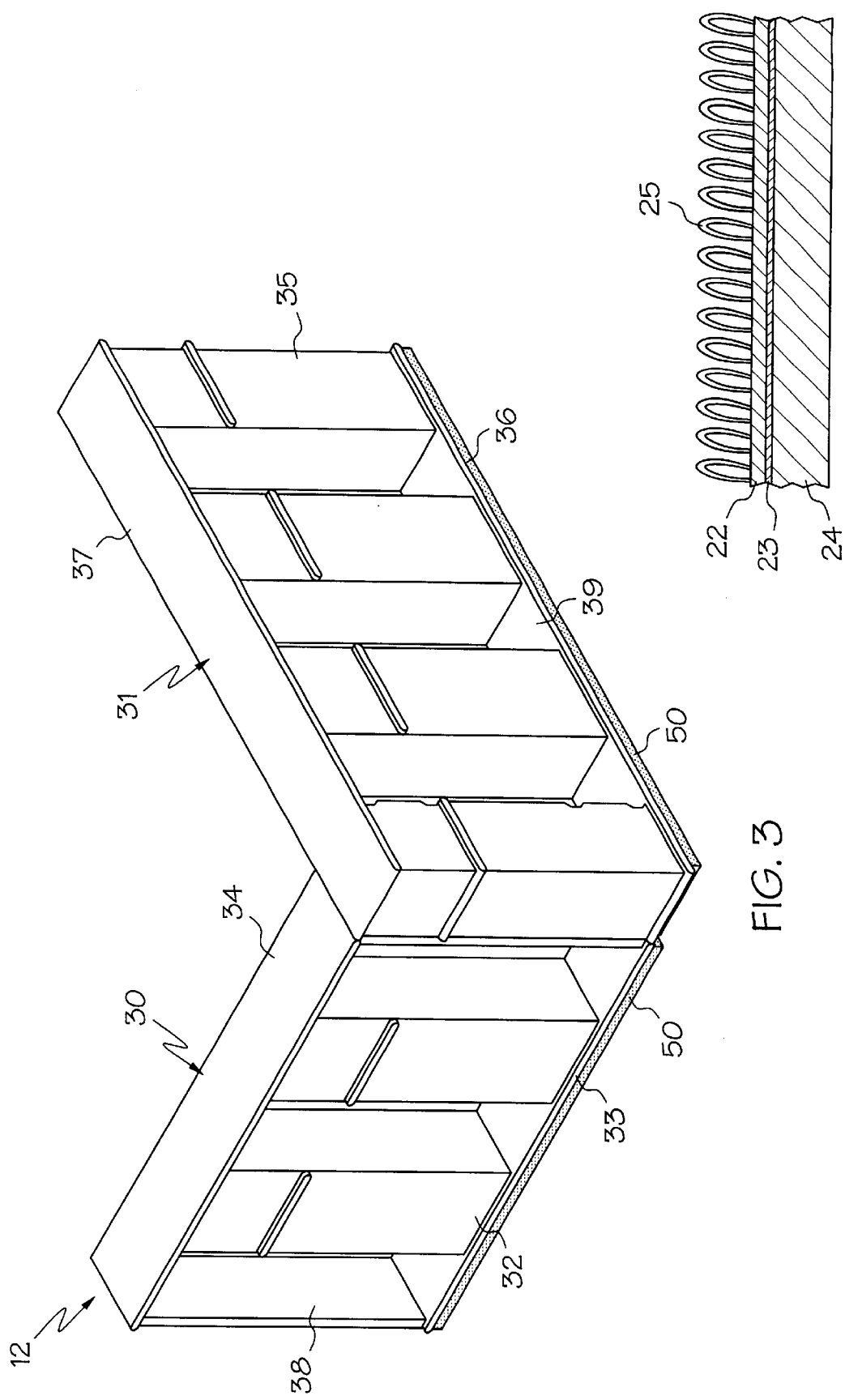

CARGO HOLD SYSTEM FOR MOTOR VEHICLES

FIELD OF THE INVENTION

This invention relates to a cargo hold system for use in a motor vehicle. More particularly, the invention relates to a cargo hold system for use in a cargo area of a motor vehicle for holding transported articles in selectable positions.

BACKGROUND OF THE INVENTION

Personal use motor vehicles such as automobiles, station wagons, hatchbacks, sports utility vehicles, vans, and, in recent years, pick-up trucks are used on an almost daily basis to transport people and to transport articles for household use. Consumer articles such as groceries are typically bagged and placed inside the vehicle on a seat, floor area or trunk area. Consumer articles such as potted plants are more likely to be put into a trunk area or a back cargo area of the vehicle. Small reuseable articles for occasional use such as fishing tackle, sports equipment and the like will likely be placed in the vehicle where they can be out of sight but conveniently retrieved, e.g. the trunk or cargo area.

Anyone who has ever driven a motor vehicle knows that small articles to be transported can pose a problem. Grocery bags in particular represent a widely experienced problem. They tend to fall over and spill their contents when the vehicle turns a corner even at slow speeds and certainly upon sudden stops. The problem is lessened in automobiles that have deep back seat floor wells. Vehicles with a flat floor area or a flat back cargo area present a real challenge.

The problems of transporting small articles in the personal vehicle without incident is well recognized. Most people will carefully pack articles up against a back seat and door wall or place objects such as blankets around the articles to keep them from tipping. This can work depending on the care and effort expended by the individual. Others have purchased various racks and organizers sold for this purpose. For example, see U.S. Pat. Nos. 4,718,584, 4,842,460 and 5,031,7669. The racks and organizers appear to serve their purpose. However, it is also apparent that such products take up valuable space when not in use. They also tend not to be versatile in the types of articles they can effectively hold.

Motorists have widely experienced problems with transporting the occasional personal items for many years without having a good solution. In accord with this need, there has now been developed a system for use in motor vehicles of all styles that solve the problem. The system is economical, its use is readily understood and it is effective for transporting a variety of different sized and shaped articles.

SUMMARY OF THE INVENTION

A motor vehicle cargo hold system securely holds articles for transport. The cargo hold system comprises a configured molded floor mat and at least one rearrangeable rigid retention member. The molded floor mat has a top surface of fiber loops extending therefrom. A thermoplastic backing on the carpet holds the fiber loops and substantially prevents them from being pulled loose. The rigid retention member has at least two linear legs which are connected to form a substantially right angle. Further, each linear leg has upstanding vertical walls and a bottom wall which has adhered to it a hook-type fastener strip. The hook-type fastener strip interacts with the loops of the molded floor mat to cause the rigid retention member to remain in position, for example wedged against an article being transported, yet is readily pulled away to free the transported article. The rearrangeable rigid retention member can be repeatedly used without causing significant damage to the fiber loops of the carpet mat.

BRIEF DESCRIPTION OF THE DRAWINGS

FIG. 2 is an enlarged partial elevational view in cross-section of the molded floor mat of FIG. 1.

FIG. 3 is a view in perspective of one of the rigid retention members of the cargo hold system of FIG. 1.

DETAILED DESCRIPTION OF THE INVENTION

The cargo hold system of the invention is described in detail in the following paragraphs and with particular reference to the drawings. The system of the invention is particularly conducive to use in a back cargo area of a station wagon, hatchback, sports utility vehicle and van. This particular use is shown in the figures. It is also useful in the back seat area of automobiles and pick-up trunks, especially those with a flat floor area. It should be understood the cargo hold system of the invention can be adapted for use in any interior area of any motor vehicle style simply by configuring the molded floor mat to fit the area being served.

Figure 1:
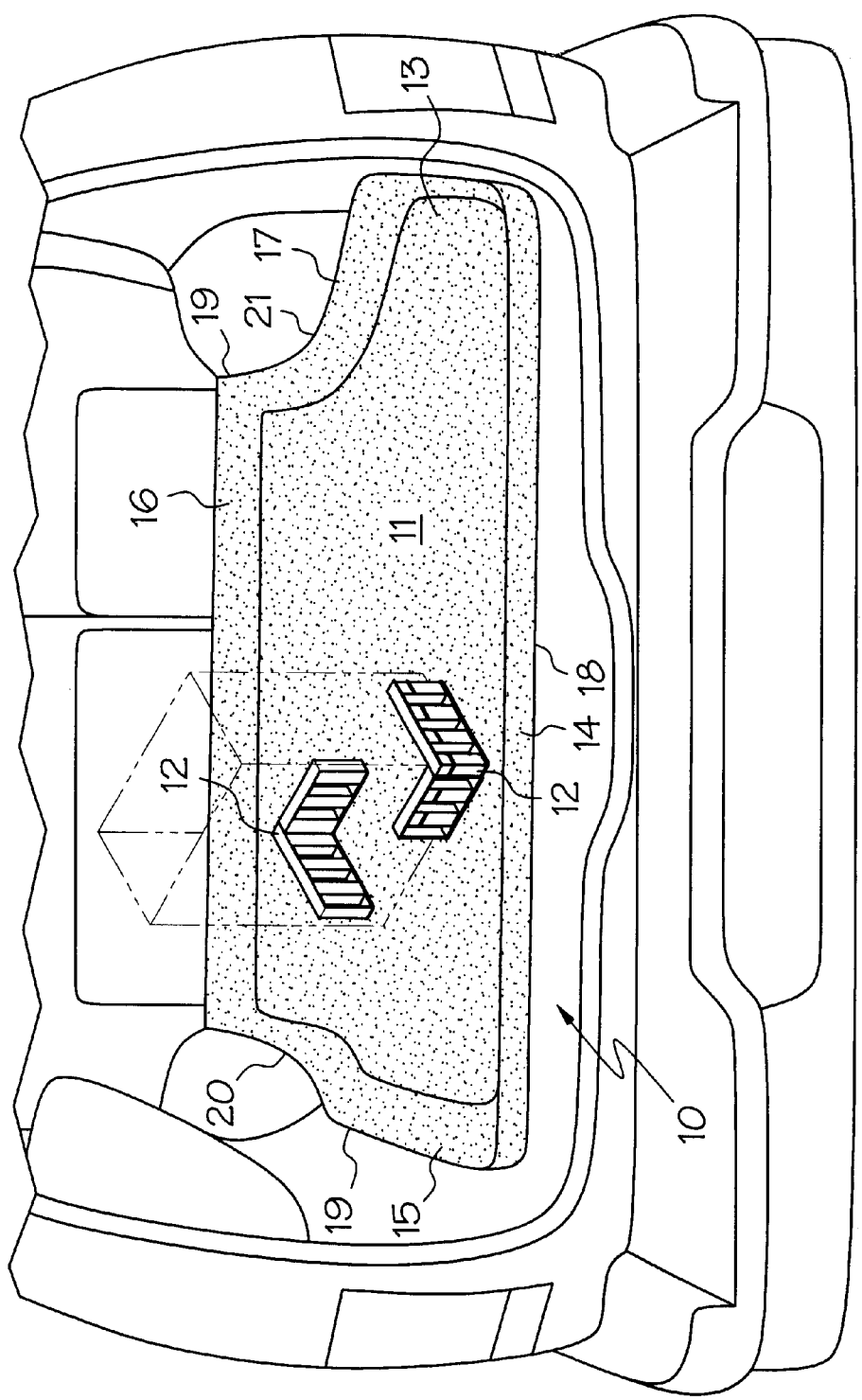
FIG. 1 is an environmental view of the cargo hold system of the invention showing a molded floor mat positioned in a cargo area of a motor vehicle and two rigid retention members selectively placed on the molded floor mat with an article being transported shown in phantom.

With reference to FIG. 1, the cargo hold system 10 of the invention comprises a molded floor mat 11 and two rigid retention members 12 having a L-shape. The molded floor mat 11 is configured to fit a particular vehicle with each peripheral edge preferably shaped to abut a wall, back seat or door of the vehicle. The rigid retention members 12 are of varying length and height, though each interacts with the surface of the molded floor mat to create a secure, but temporary barrier to confine one or more articles. Each of the components of the cargo hold system is described in detail below.

The molded floor mat 11 has a substantially flat base 13 and preferably, raised walls 14, 15, 16 and 17 around its periphery to create a tray-like center area. The raised wall 14 adjacent a back door sill and the opposed raised wall 16 are double walled and each has a substantially horizontally extending floor engaging peripheral lip 18. Each of the double walled raised walls 14 and 16 has an inside wall which extends substantially vertically from the flat base up to about three inches, preferably about one inch to about two inches, a substantially horizontal top wall, and an outside wall which extends substantially vertically down to the approximate same plane as the flat base 13. The floor engaging peripheral lip 18 extends substantially horizontally from the outside wall. The peripheral lips lie in substantially the same plane as the flat base 13 of the floor mat. The side raised walls 15 and 17 are single walls, each with a peripheral lip 19 which extends substantially horizontally to structurally blend into side walls of the vehicle's cargo area.

The tray-like center area of the molded floor mat helps to hold spilled liquids and debris within its confines. This further protects against staining or soiling of any vehicle carpet underlying the molded floor mat. It also facilitates cleaning of the carpet surface of the molded floor mat. Still useful, though, are molded car mats that are substantially flat from edge to edge without the tray-like center area.

The molded floor mat 11 must be specially configured for the vehicle where it is to be used. As shown, edge areas 20 and 21 on each lateral side is curved inwardly to accommodate the vehicle's back wheel wells. The substantially flat center tray area may also have raised areas and depressed areas to accommodate the vehicle's variously shaped floor surface area. As evident from FIG. 1, the molded floor mat is shaped to fit snugly into the interior vehicle area to be covered with minimal uncovered peripheral open areas. As such, the relatively expensive original equipment carpet is fully protected.

As best seen in FIG. 2, the molded floor mat 11 includes an upper carpet layer 22, an intermediate thermoplastic binder layer 23 and a lower thermoplastic molding layer 24. The carpet layer 22 is comprised of a multiplicity of fiber loops 25 which extend upwardly. The fiber loops 25 are made from natural or synthetic fiber strands, though it is preferred that the strands be made from a synthetic material because such materials are more durable and clean better. Polyester, polypropylene and nylon are examples of widely used strands. Polypropylene strands are highly preferred because of their ability to repel moisture, resist staining, and are easily cleaned. The thermoplastic binder layer holds the fiber loops in a coherent mass and facilitates application of the lower thermoplastic molding layer as discussed below.

The carpet used in the molded floor mat is produced in a manner which makes it particularly useful as a part of the cargo hold system. The carpet, most importantly, has a series of fiber loops which are so securely held to its thermoplastic binder layer that repeated hook fastener engagements can be withstood without substantial loop pull-outs or loop breakings. The carpet is commercially available. It is made by what is considered in the industry as a needle punch process. Initially, a fibrous web of fiber is produced. The fibrous web is cross laid by a series of conveyor belts. Multiple layers of fibrous webs, e.g. up to twelve layers, are accumulated on a floor apron. The cross laid layers are fed into a pre-needling needle loom which consolidates the fibers together through a mechanical entanglement process of felting needles moving up and down continuously through the layers. The resultant felt then passes through a second needle loom which needles from the opposite direction to tuck loose fibers back into the felt to make a relatively smooth and flat surface. At this point, the felt goes to a third needle loom called a structuring loom. This loom uses fork or rib needles to produce tufts of looped fibers as the needles pass repeatedly up and down through the pre-needled felt to give the carpet.

The intermediate thermoplastic binder layer 23 is now applied to the carpet's lower side to forming a backing and securely holding the fiber loops. Polyethylene is one example of a suitable binder, though other conventional thermoplastic binders can be used. It is applied by dispersion coating, extrusion coating, calendaring and lamination.

The lower thermoplastic molding layer 24 represents the underside of the floor mat. This layer provides a tough, elastic and non-tacky backing. Primarily, it imparts stiffness and moldability to the carpet so that the carpet can be molded to a desired deeply contoured shape and such shape be retained. Examples of suitable thermoplastics include polymers of ethylene and propylene, copolymers of ethylene with ethylenically unsaturated monomers, e.g. ethylenevinyl acetate, acrylates, polyvinyl chlorides and styrene-butadiene polymers. Preferably, as explained below, the thermoplastic material is capable of being softened at a temperature of from about 190 degrees F. to about 240 degrees F. to become readily moldable. The backing is applied to the carpet in any manner, e.g. by dispersion coating, extrusion coating, calendaring and lamination and is normally applied immediately after the intermediate thermoplastic binder layer as part of the same processing step.

Each rigid retention member forming a part of the cargo hold system has at least two linear legs which are connected together to form an angle of from about 75 degrees to about 105 degrees. At least one and preferably at least two rigid retention members are used to interact with the surface of the molded floor mat 11 to create a stable barrier to hold articles being transported. Two linear legs can be joined at their respective terminuses to form a generally L-shaped retention member as depicted in FIGS. 1–3 and further discussed below. Other retention members having the requisite angle include generally C-shaped, E-shaped, H-shaped, T-shaped and U-shaped members. The aforementioned shaped retention members can have two, three, four, or more linear legs appropriately connected together. The individual linear legs can be arranged in the particular shaped retention member needed by the user for the task at hand. Alternatively, the retention member can be permanently shaped for a more universal use.

It should be understood in practice any number of rigid retention members can be used as a part of the cargo hold system 10. Thus, one retention member can be used in conjunction with a corner of the molded floor mat or an interior wall of the vehicle to effectively hold an article in place. Two retention members can be positioned on the molded floor mat diametrically opposite one another such as depicted in FIG. 1 to create a four-side barrier to hold an article. Three or four retention members can be used to create a full three or four sided barrier to hold an article. Multiple retention members can be used independently, in pairs, or in various geometric patterns with one another to create virtually any temporary barrier configuration to hold a multitude of articles having a multitude of shapes.

Figure 4:
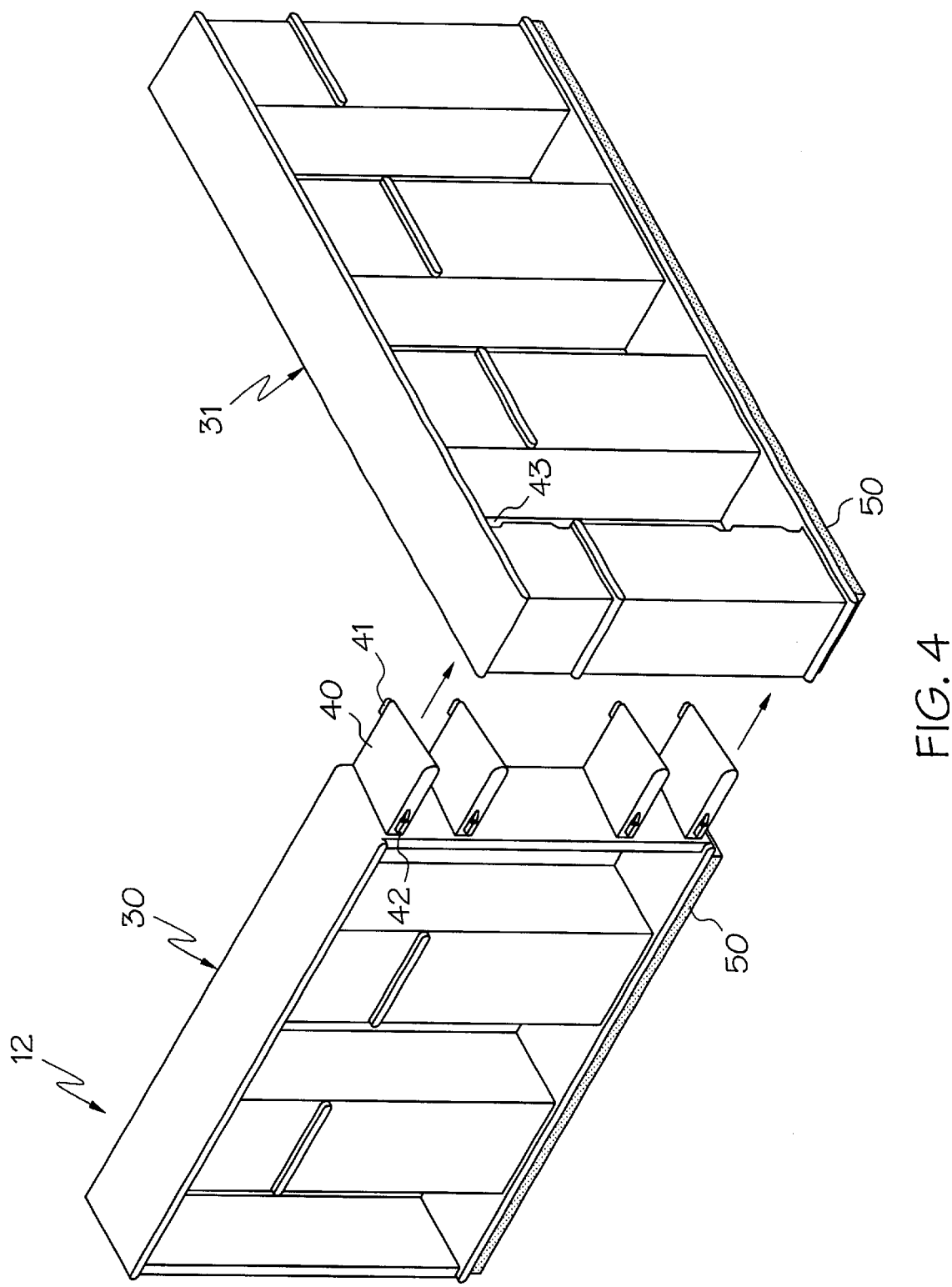
FIG. 4 is an exploded view in perspective showing outside vertical wall surfaces of the rigid retention member of FIG. 3.
Figure 5:
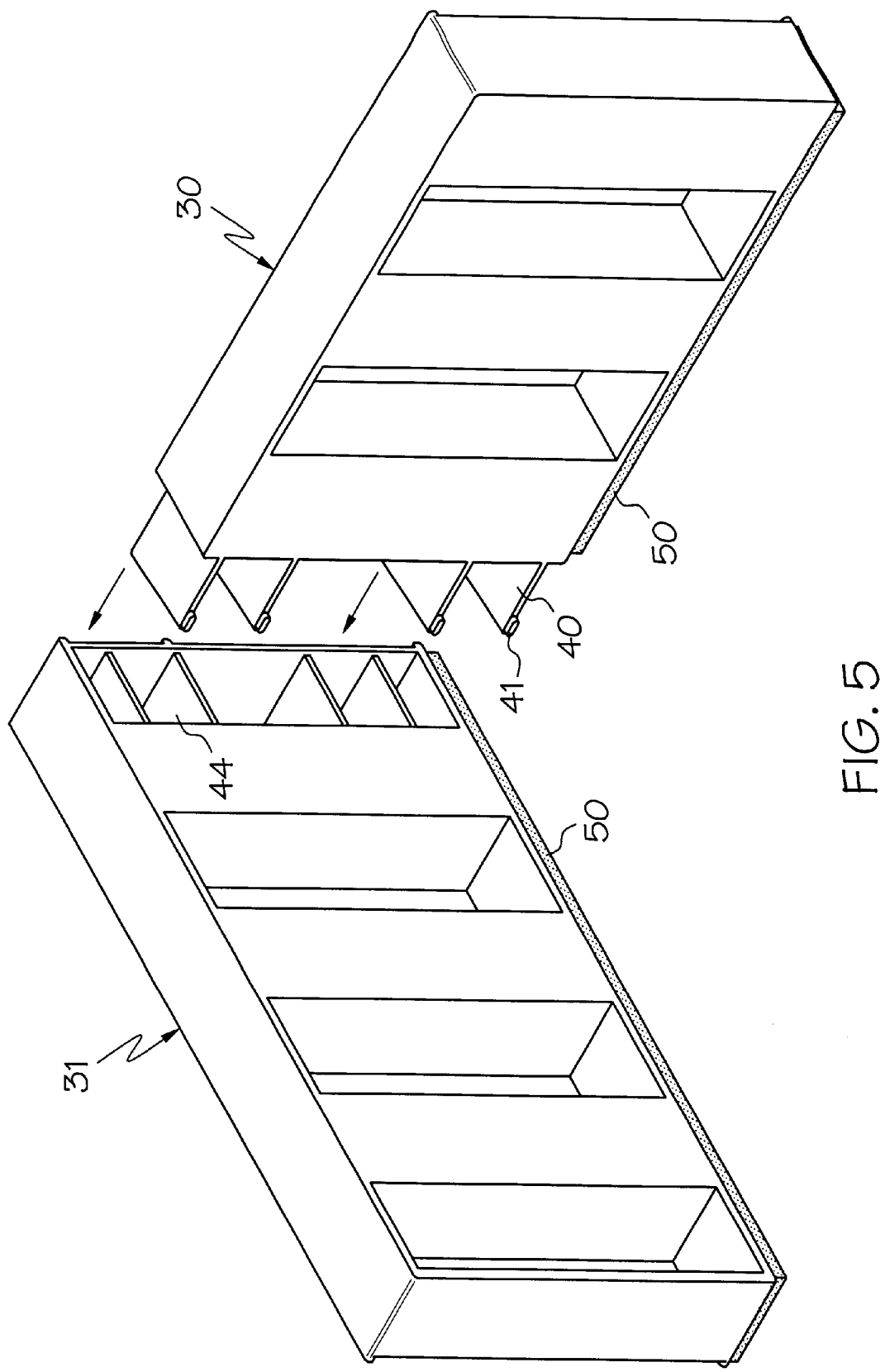
FIG. 5 is an exploded view in perspective showing inside vertical surfaces of the rigid retention member of FIG. 3.

Each rigid retention member 12 depicted in FIGS. 3–5 has a first linear leg 30 and a second linear leg 31 connected at substantially right angles at their respective terminuses to form L-shaped retention members. The leg 30 is essentially an elongated rectangular-shaped block. It has an upstanding article-engaging substantially vertical wall 32, a cargo bed-engaging substantially horizontal bottom wall 33 and a substantially horizontal top wall 34. The second leg 31 similarly has an upstanding article-engaging substantially vertical wall 35, a cargo bed-engaging substantially horizontal bottom wall 36 and a substantially horizontal top wall 37. The legs are preferably made of a synthetic plastic. Wood, composites and metal can also be used in place of the plastic, though do not provide the same manufacturing and cost advantages as the plastic. The legs 30 and 31 can be solid, though preferably have cut-outs 38 and 39, respectively for weight reduction purposes and raw material savings.

The legs 30 and 31 of the retention member 12 preferably have the same height, though their lengths can vary. A typical upstanding vertical wall height ranges from about three inches to about ten inches, preferably from about four inches to about eight inches. Typical wall lengths range from about five inches to about fifteen inches, preferably about eight inches to about twelve inches.

The rigid retention member 12 can be one piece or, as evident in FIGS. 4 and 5, can be formed from two linear legs which are joined at their ends to form the L-shaped retention member. Preferably, the retention member 12 is manufactured as two pieces for ease of manufacturing and also for ease of shipping. As should be evident, multiple low profile linear pieces are easier to make and ship as opposed to one bulky irregular-shaped piece. As seen in FIGS. 4 and 5, the first linear leg 30 is provided with locking tabs 40 at one end. The locking tabs 40 extend horizontally from the leg's terminus. Each tab has a retention lug 41 at a distal terminus on one side and a friction lug 42 at a proximal terminus and on an opposed side. The second linear leg 31 is shaped to receive and permanently hold the tabs 40 of the first leg 30. As apparent in FIG. 4, the second linear leg 31 has holes 43 to receive the retention lugs. As best seen in FIG. 5, the second leg 31 has ribs 44 to strengthen the member and aid in creating a friction fit with the first linear leg 30.

The separate legs 30 and 31 are readily assembled. The locking tabs 40 on the first linear leg 30 are aligned with the holes 43 of the second linear leg 31. The two legs are next pushed fully together to permanently lock the retention lugs in place.

The linear legs used to form the retention member can also be connected by other means. Connecting means such as hook and loop fasteners, adhesive, double sided adhesive tape, screws, bolts and nuts are conventional and can be used to connect ends of the linear legs together in a permanent or semi permanent fashion to give the requisite angle.

With reference to FIG. 3, the bottom wall of the rigid L-shaped retention member 12 has a hook-type fastener strip 50 extending substantially along its full length. Hook-type fasteners 50 are commercially available as Velcro. Preferably, an industrial grade hook-type fastener is used. Such strips typically are available with an adhesive backing.

Figure 6:
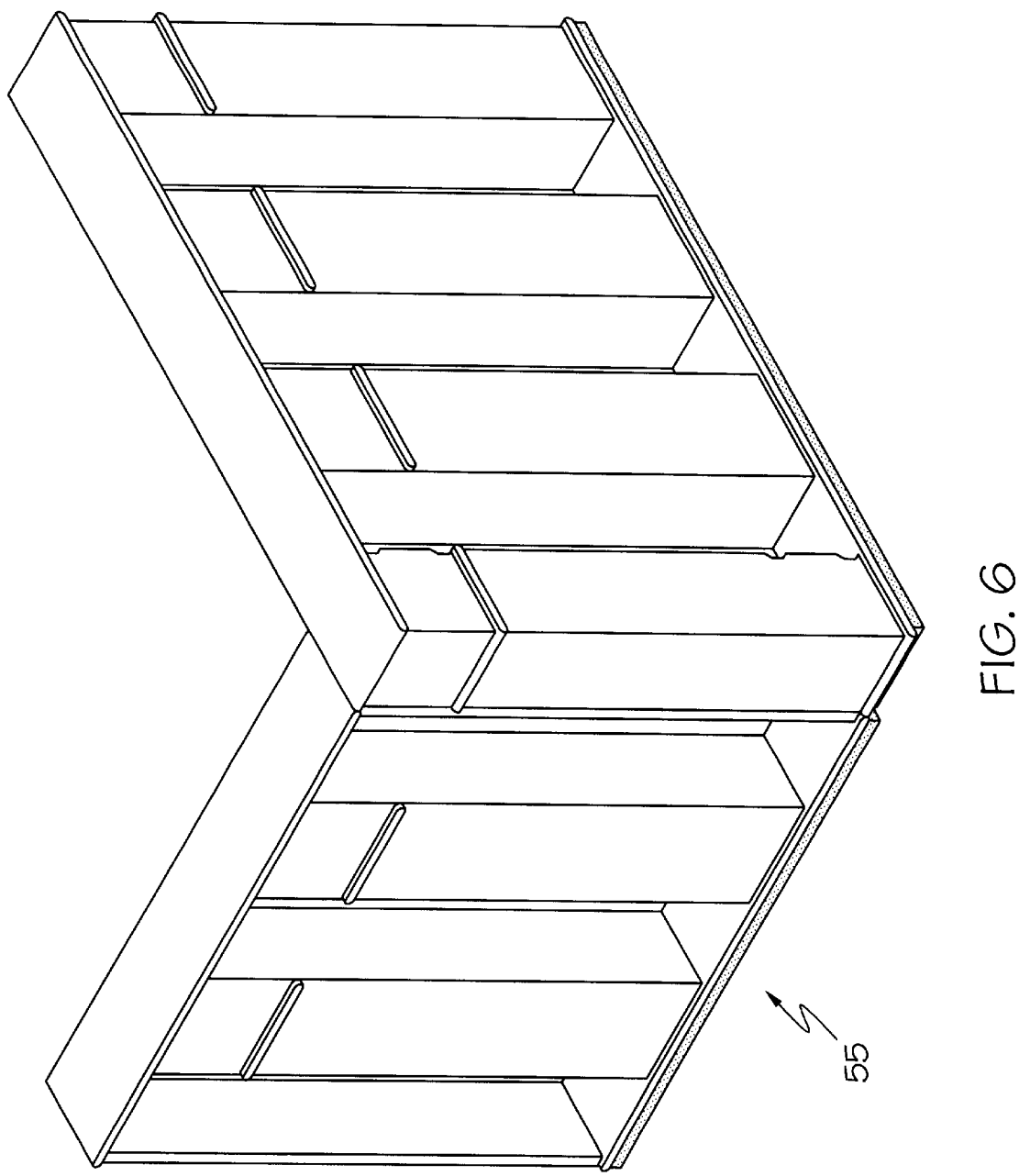
FIG. 6 is a view in perspective of another rigid retention member having tall vertical walls for use with the molded floor mat of FIG. 1.
Figure 7:
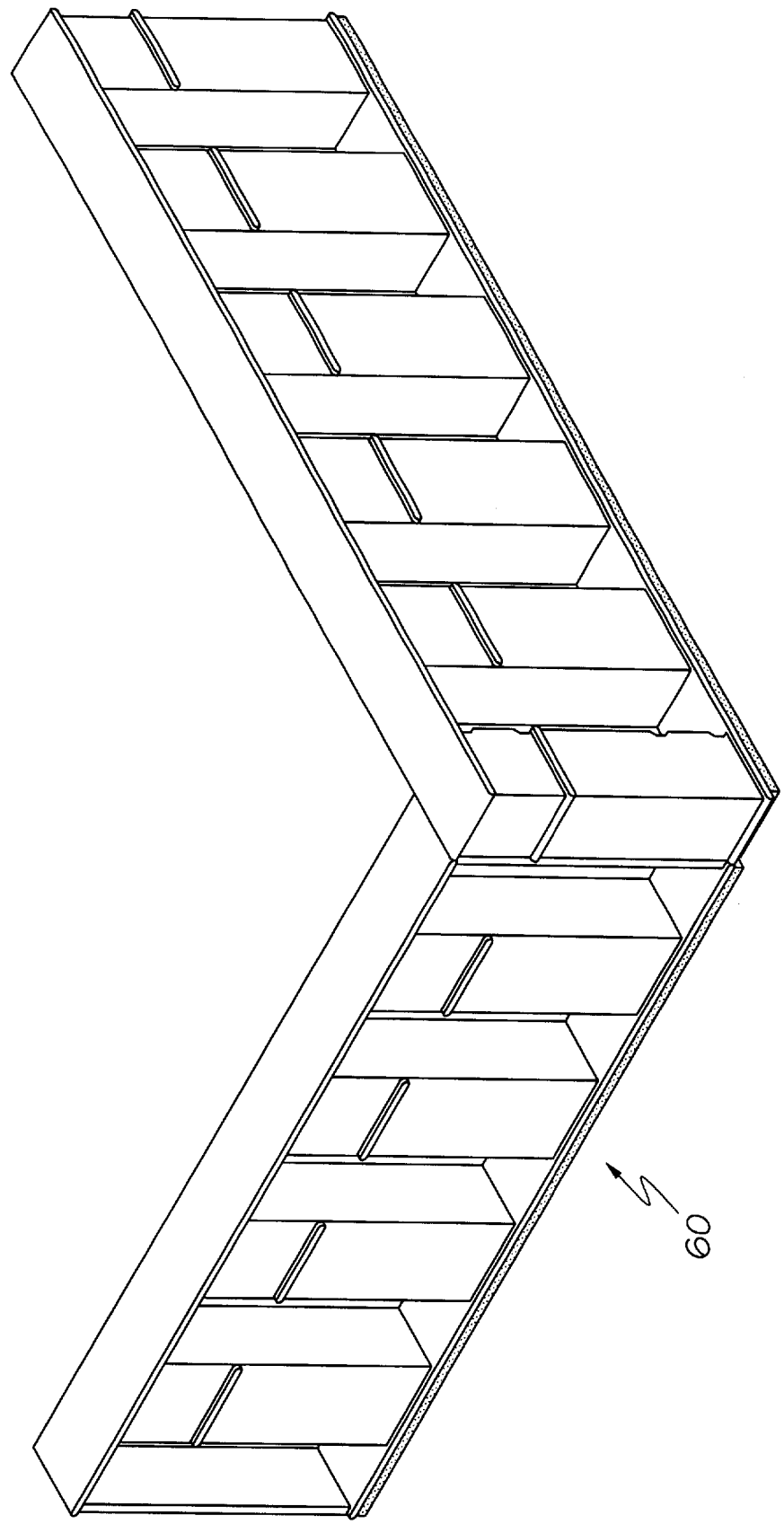
FIG. 7 is a view in perspective of still another rigid retention member having long vertical walls for use with the molded floor mat of FIG. 1.

FIGS. 6 and 7 depict alternative rigid L-shaped retention members. As shown in FIG. 6, the rigid L-shaped retention member 55 has relatively high upstanding vertical walls. Such L-shaped retention members are particularly useful for holding tall objects such as grocery bags in place. As shown in FIG. 7, the rigid L-shaped retention member 60 has relatively long upstanding vertical walls and is useful for holding low profile articles such as potted plants and plant trays in place.

Optional features can be added to the cargo hold system. For example, the bottom of the molded floor mat can have one or more gripper plates attached to prevent any slippage during use. Bolts or other fasteners also can extend through the vehicle's floor for a positive retention system. A flat shelf can be configured, preferably to snugly fit against the vertical walls forming the cargo area, to rest on top of the rigid retention members to create added surface area. The shelf is rigid or at least semi-rigid. Preferably, it has means to be semi-permanently secured to the underlying rigid retention members, e.g. mating hook and loop fasteners. Still other features to enhance the appearance and utility of the cargo hold system can be used.

In operation, the molded floor mat is simply laid in place in the motor vehicle. Its edges should abut against vertical interior walls of the vehicle to fit snugly. Next, the rigid retention member is lifted from the carpet. The article to be transported is placed on the carpet. The retention member is positioned with its hook-type fastener next to the article so as to engage the fiber loops extending from the surface of the carpet. When properly positioned, the article is wedged between two or more rigid shaped bodies or held by one rigid retention member in a corner or other confining position. Upon arrival at the desired location, the rigid retention member is simply lifted up and placed aside to free the article.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

What is claimed is:

1. A cargo hold system for temporarily securing articles while being transported in a vehicle, said cargo hold system comprising:
    (a) a molded floor mat configured to fit in a confined floor area of the vehicle, said molded floor mat having an upper layer of a carpet wherein loops of thread extend therefrom and a lower layer of a thermoplastic molding material adhered to an underside of the carpet to give a defined permanent shape to the molded floor mat; and
    (b) at least one rigid retention member for selective positioning on the molded floor mat to physically restrain from movement an article being transported, wherein each said at least one rigid retention member has at least two linear legs connected to form an angle of from about 75 degrees to about 105 degrees and having upstanding substantially vertical walls and substantially horizontal bottom walls and further the bottom walls having a hook-type fastener strip adhered thereto to interact with the loops of the carpet of the molded floor mat, whereby each said rigid retention member can be selectively positioned on the molded floor mat and remain in place to trap the article within its confines yet is readily lifted therefrom to free the article for removing from the vehicle.

2. The cargo hold system of claim 1 wherein the molded floor mat has a tray-like center area to receive and retain within its confines spilled liquids and debris.

3. The cargo hold system of claim 2 further wherein the molded floor mat has an intermediate thermoplastic binder layer.

4. The cargo hold system of claim 1 wherein the carpet is made of a polypropylene fiber.

5. The cargo hold system of claim 1 wherein each rigid retention member has a first linear leg and a second linear leg and further each said leg is from about five inches to about fifteen inches in length and about three inches to about ten inches in height.

6. The cargo hold system of claim 5 wherein each linear leg of the rigid retention member ranges from about eight inches to about twelve inches in length and about four inches to about eight inches in height.

7. The cargo hold system of claim 1 wherein each of said at least one rigid retention member has a first linear leg joined at a terminus to a terminus of a second linear leg to form a substantially right angle.

8. The cargo hold system of claim 7 wherein the first linear leg of each said at least one rigid retention member has a set of locking tabs extending from the first linear leg terminus and the second linear leg has a set of receiving holes in the second linear leg terminus whereby said first linear leg is joined to said second linear leg through the locking tabs to form a permanent engagement.

9. The cargo hold system of claim 1 comprising at least two rigid retention members.

10. The cargo hold system of claim 9 wherein the rigid retention members are L-shaped.

11. A cargo hold system for temporarily securing articles while being transported in a vehicle, said cargo hold system comprising:

(a) a molded floor mat configured to fit in a confined floor area of the vehicle, said molded floor mat having a substantially flat base with raised peripheral walls to form a center tray-like area and further said floor mat having an upper layer of a carpet wherein loops of thread extend therefrom, and a lower layer of a thermoplastic material adhered to an underside of the upper layer of carpet to give a defined permanent shape to the molded floor mat; and (b) at least two rigid retention members for selective positioning on the molded floor mat to physically restrain from movement an article being transported, each said rigid retention member having at least two linear legs joined to form a substantially right angle and further having upstanding article-engaging vertical walls and carpet-engaging bottom walls and further the bottom walls having a hook-type fastener strip adhered thereto to interact with the loops of the carpet of the molded floor mat, whereby each said rigid retention member can be selectively positioned on the molded floor mat and remain in place to trap the article within its confines yet is readily removed therefrom to free the article for removing from the vehicle.

12. The cargo hold system of claim 11 wherein each of the raised peripheral walls of the molded floor mat has a substantially horizontally extending peripheral lip for engaging a surface of a cargo area of the vehicle.

13. The cargo hold system of claim 11 wherein the carpet is made of a polypropylene fiber by a needle punch process.

14. The cargo hold system of claim 11 wherein each rigid retention member has a first linear leg and a second linear leg and further each said leg is from about five inches to about fifteen inches in length and about three inches to about ten inches in height.

15. The cargo hold system of claim 14 wherein each leg of the rigid retention member ranges from about eight inches to about twelve inches in length and about four inches to about eight inches in height.

16. The cargo hold system of claim 11 wherein each of said at least two rigid retention members has a first leg joined to a second leg to form a L-shaped retention member.

17. The cargo hold system of claim 16 wherein the first leg of the L-shaped retention member has a set of locking tabs extending from one terminus and the second leg has a set of receiving slots extending from one terminus whereby said first leg is joined to said second leg through the locking tabs to form a permanent engagement.

18. The cargo hold system of claim 11 comprising two rigid retention members.

19. A cargo hold system for temporarily securing articles while being transported in a vehicle, said cargo hold system comprising:

(a) a molded floor mat configured to fit in a confined floor area of the vehicle, said molded floor mat having a substantially flat base with raised peripheral walls to form a center tray-like area and further said floor mat having an upper layer of a carpet wherein loops of thread extend therefrom, an intermediate thermoplastic binder layer to hold the loops in the carpet and a lower layer of a thermoplastic material adhered to an underside of the intermediate thermoplastic binder layer to give a defined permanent shape to the molded floor mat; and (b) at least two rigid generally L-shaped retention members for selective positioning on the molded floor mat to physically restrain from movement an article being transported, each said rigid generally L-shaped retention member having a first linear leg and a second linear leg and further each said leg is from about five inches to about fifteen inches in length and about three inches to about ten inches in height and further having upstanding article-engaging vertical walls and carpet-engaging bottom walls and further the bottom walls having a hook-type fastener strip adhered thereto to interact with the loops of the carpet of the molded floor mat, whereby each said rigid generally L-shaped retention member can be selectively positioned on the molded floor mat and remain in place to trap the article within its confines yet is readily removed therefrom to free the article for removing from the vehicle.

20. The cargo hold system of claim 19 wherein the first leg of each generally L-shaped retention member has a set of locking tabs extending from one terminus and the second leg of each retention member has a set of receiving slots extending from one terminus whereby a respective said first leg is joined to a respective said second leg through the locking tabs to form a permanent engagement.

21. The cargo hold system of claim 1 wherein the upper layer of the molded floor mat is a needle punch carpet of synthetic strand fiber loops.

22. The cargo hold system of claim 11 wherein the upper layer of the molded floor mat is a needle punch carpet of synthetic strand fiber loops.

23. The cargo hold system of claim 19 wherein the upper layer of the molded floor mat is a needle punch carpet of synthetic strand fiber loops.

* * * * *